United States Patent
Kinoshita (10) Patent No.: US 10,122,253 B2
(45) Date of Patent: Nov. 6, 2018

(54) POWER CONVERSION APPARATUS AND INITIAL CHARGING METHOD OF THE SAME

(71) Applicant: Toshiba Mitsubishi-Electric Industrial Systems Corporation, Chuo-ku (JP)

(72) Inventor: Shingo Kinoshita, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 15/551,815

(22) PCT Filed: Feb. 18, 2015

(86) PCT No.: PCT/JP2015/054398
§ 371 (c)(1),
(2) Date: Aug. 17, 2017

(87) PCT Pub. No.: WO2016/132471
PCT Pub. Date: Aug. 25, 2016

(65) Prior Publication Data
US 2018/0034357 A1   Feb. 1, 2018

(51) Int. Cl.
*H02M 1/08*   (2006.01)
*H02M 1/14*   (2006.01)
(Continued)

(52) U.S. Cl.
CPC .............. *H02M 1/08* (2013.01); *H02M 1/14* (2013.01); *H02M 5/458* (2013.01); *H02M 2001/0048* (2013.01)

(58) Field of Classification Search
CPC ........ H02M 1/08; H02M 1/081; H02M 1/084; H02M 1/088; H02M 1/14; H02M 5/42;
(Continued)

(56) References Cited

U.S. PATENT DOCUMENTS 6,204,627 B1 * 3/2001 Watanabe ................. B04B 9/10
                                                                    318/729
7,612,542 B2 * 11/2009 Eguchi ................... H02M 3/156
                                                                    323/222
(Continued)

FOREIGN PATENT DOCUMENTS

| JP | 11-98610 A | 4/1999 |
| JP | 2006-350900 A | 12/2006 |
| JP | 2013-59153 A | 3/2013 |

OTHER PUBLICATIONS

International Search Report dated May 12, 2015, in PCT/JP2015/054398 filed Feb. 18, 2015.
(Continued)

*Primary Examiner* — Matthew Nguyen
(74) *Attorney, Agent, or Firm* — Oblon, McClelland, Maier & Neustadt, L.L.P.

(57) ABSTRACT

The present disclosure provides a power conversion apparatus and an initial charging method of the same to control a closing phase angle at the time of switching on a power source, to suppress an overvoltage of a DC voltage, and to prevent overcharge and breakage of parts caused by the overvoltage. A peak voltage value of an input voltage, a total secondary side converted winding resistance of a primary side and a secondary side of an input transformer, a total leakage inductance of the primary side and the secondary side of the input transformer, a capacitor, and a power source frequency are substituted in a mathematical expression, and a closing phase angle is varied at predetermined intervals to obtain first half-wave peak voltage values of the capacitor voltage at the closing phase angles to close a circuit breaker.

5 Claims, 9 Drawing Sheets

(51) Int. Cl.
*H02M 5/458* (2006.01)
*H02M 1/00* (2006.01)

(58) Field of Classification Search
CPC . H02M 5/44; H02M 5/458; H02M 2001/0048
See application file for complete search history.

(56) References Cited

U.S. PATENT DOCUMENTS 8,576,592 B2 * 11/2013 Jones ..................... H02M 1/14
363/65
2014/0247003 A1 * 9/2014 Yamasaki ............. G05B 19/00
318/802

OTHER PUBLICATIONS

International Preliminary Report on Patentability and Written Opinion dated Aug. 31, 2017 in PCT/JP2015/054398 (with English language translation).

* cited by examiner

FIRST HALF-WAVE PEAK VOLTAGE VALUE
OF CAPACITOR VOLTAGE Vc
> PEAK VOLTAGE VALUE OF INPUT VOLTAGE V2

FIRST HALF-WAVE PEAK VOLTAGE VALUE
OF CAPACITOR VOLTAGE Vc
< PEAK VOLTAGE VALUE OF INPUT VOLTAGE V2

POWER CONVERSION APPARATUS AND INITIAL CHARGING METHOD OF THE SAME

TECHNICAL FIELD

Embodiments of the present invention relate to a power conversion apparatus and an initial charging method of the same.

BACKGROUND ART

Regarding methods of initially charging an inverter from a power source via an input transformer, conventionally methods to use a current limiting resistor or a current limiting reactor were employed. However, from the viewpoint of compactification and cost reduction of an apparatus, methods of switching on the power source to charge the inverter directly without using these parts for initial charging have been employed.

PRIOR ART DOCUMENT

Patent Document

Patent Document 1: Japanese Patent Application Publication No. 2004-266978

SUMMARY OF THE INVENTION

Problem to be Solved by the Invention

However, in the methods of switching on the power source to initially charge the inverter directly without using the above-described parts for initial charging, there was a problem that a voltage of not less than a peak value of an input voltage is applied to a smoothing capacitor of the inverter, by a counter electromotive force which is generated in a leakage inductance of the input transformer, to cause breakage of the parts.

The present invention has been made to solve the above-described problem, and makes it an object to provide a power conversion apparatus and an initial charging method of the same which, in a method of switching on a power source to initially charge an inverter directly without using parts for initial charging, controls a closing phase angle at the time of switching on the power source, to suppress an overvoltage of a DC voltage, and thereby can use a charging method to prevent overcharge caused by the overvoltage, and can solve the problem relating to the above-described breakage of the parts.

Means for Solving the Problem

In order to achieve the above-described object, a power conversion apparatus of the present invention is characterized by comprising an input transformer which converts a high voltage power of a high voltage power source into an AC power which an inverter device requires, a circuit breaker which is arranged between the high voltage power source and the input transformer, and closes or breaks an electric circuit for supplying the high voltage power to be supplied from the high voltage power source to the input transformer, a converter section which converts the AC power converted by the input transformer into a DC power, a smoothing capacitor which smooths the DC power converted by the converter section, and a synchronous switching control device which detects a phase angle of a voltage of the high voltage power source, and controls to close or break the circuit breaker, at a timing when the detected phase angle reaches a prescribed phase angle.

EMBODIMENTS TO PRACTICE THE INVENTION

Hereinafter, a power conversion apparatus 100 according to the present embodiment and an operation of a charging method of the same will be described with reference to the drawings.

Embodiment 1

Figure 1:
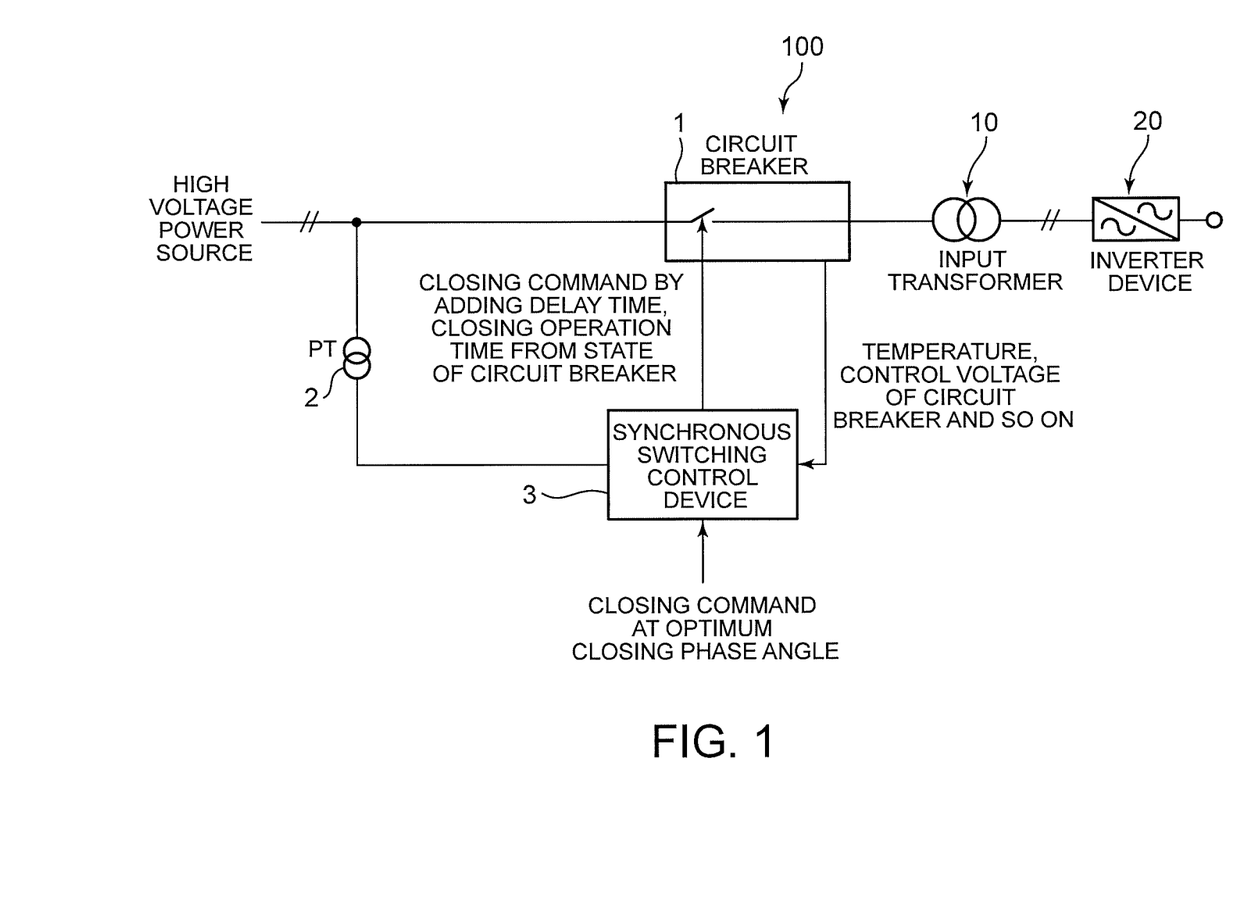
FIG. 1 A diagram for describing a configuration of a power conversion apparatus 100 according to the present embodiment.

FIG. 1 is a diagram for describing a configuration of the power conversion apparatus 100 according to the present embodiment. The power conversion apparatus 100 is composed of a circuit breaker 1, a potential transformer 2, a synchronous switching control device 3, an input transformer 10, an inverter device 20 and so on.

A high voltage power source is connected to an input terminal of the circuit breaker 1, and an output terminal thereof is connected to a primary side terminal of the input transformer 10. In addition, in the present embodiment, a case in which the high voltage power source is a single phase AC power source will be described below.

The circuit breaker 1 closes or breaks an electric circuit for supplying a high voltage power to be supplied from the above-described high voltage power source to the input transformer 10.

A secondary side terminal of the input transformer 10 is connected to an input terminal of the inverter device 20 which composes the power conversion apparatus 100 according to the present embodiment.

The synchronous switching control device 3 detects a phase angle of a voltage of the high voltage power source, and controls closing or breaking of the circuit breaker 1 at a timing when the phase angle reaches a prescribed phase angle. As this result, the high voltage power to be supplied from the high voltage power source is supplied to or broken from the inverter device 20 via the input transformer 10.

The input transformer 10 transforms a voltage of the high voltage power source into a voltage of a low voltage power source. The power transformed in this manner is supplied to the inverter device 20.

The inverter device 20 supplies a required power to a load not shown.

Figure 2:
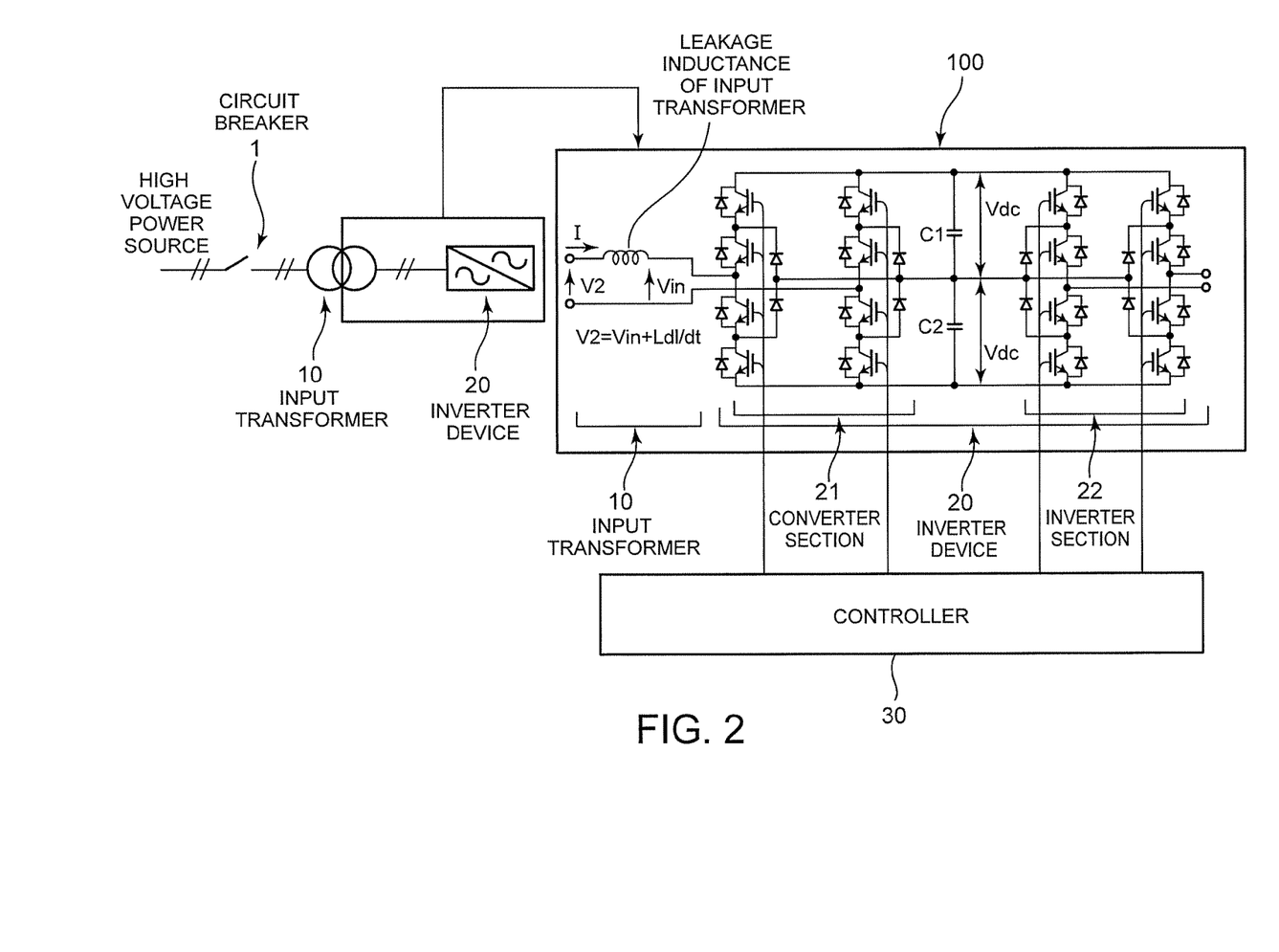
FIG. 2 A diagram showing a secondary side equivalent circuit of the input transformer 10 and a circuit configuration of the inverter device 20 connected to a secondary side terminal of the input transformer 10.

FIG. 2 shows a secondary side equivalent circuit of the input transformer 10 and a circuit configuration of the inverter device 20 connected to the secondary side terminal of the relevant input transformer 10.

The inverter device 20 is configured to have a converter section 21, smoothing capacitors C1, C2, and an inverter section 22.

The converter section 21 is composed of a plurality of switching devices, and converts the AC power supplied from the secondary side terminal of the input transformer 10 into a DC power. Gate terminals of the respective switching devices composing the converter section 21 are connected to a controller 30, and are controlled by the relevant controller 30, and thereby the DC power is generated.

The smoothing capacitors C1, C2 are capacitors for smoothing the DC power generated by the converter section 21, and capacitors with a large capacitance are used therefor. When the above-described converter section 21 converts the AC power into the DC power, the plurality of the switching devices composing the relevant converter section 21 are switched, and thereby voltage ripple are generated. The relevant smoothing capacitors C1, C2 are used for smoothing the voltage ripple.

The inverter section 22 is composed of a plurality of switching devices in the same way as the converter section 21, and converts the DC power outputted from the converter section 21 into an AC power. Gate terminals of the respective switching devices composing the inverter section 22 are connected to the controller 30, and are controlled by the relevant controller 30, and thereby the AC power required for the load is generated. In addition, it becomes possible to fundamentally generate the AC power with an optional frequency, in accordance with the load, by controlling the switching devices composing the relevant inverter section 22.

Figure 3:
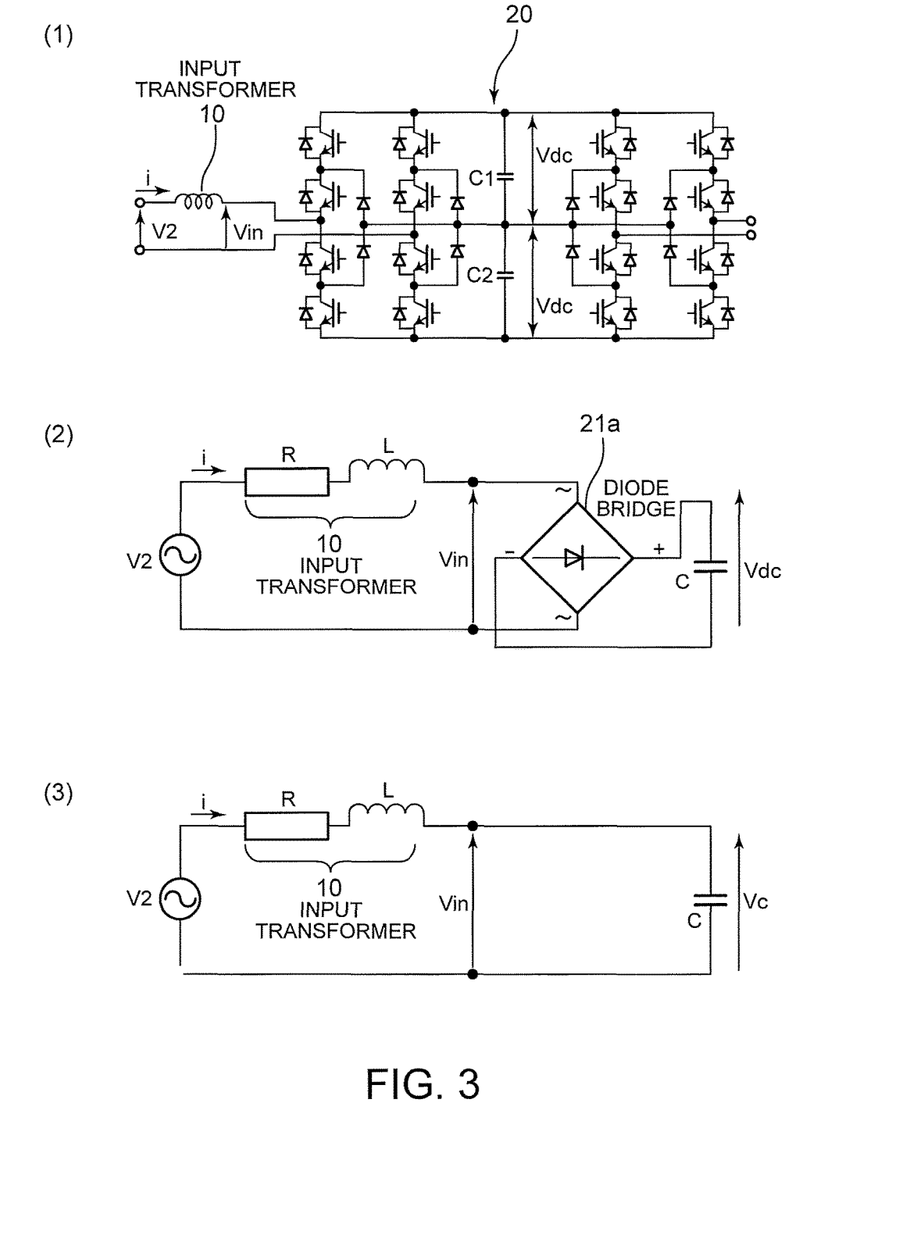
FIG. 3 A diagram for describing initial charging of the inverter device 20 of the power conversion apparatus 100 shown in FIG. 2.

FIG. 3 is a diagram for describing initial charging of the inverter device 20 of the power conversion apparatus 100 shown in FIG. 2. FIG. 3(1) is a diagram of the secondary side equivalent circuit of the input transformer 10 and a circuit diagram of a main portion of the inverter device 20.

FIG. 3(2) is an equivalent circuit diagram of a case in which the above-described FIG. 3(1) is modeled. R[Ω] is sum of the secondary winding resistor of the input transformer 10 and the primary winding resistor that is converted into secondary side. L [H] is sum of the secondary side leakage inductance of the input transformer 10 and the primary side leakage inductance that is converted into secondary side. As a result, total impedance $Z_L$ converted into secondary side of the input transformer 10 can be expressed by a mathematical expression (1) described below.

$$Z_L = R + j \cdot \omega \cdot L \quad (1)$$

In addition, the converter section 21 can be expressed using a diode bridge 21a.

FIG. 3(3) is an equivalent circuit diagram of a case in which FIG. 3(2) is simplified by omitting the diode bridge 21a shown in the above-described FIG. 3(2). A secondary terminal voltage V2 of the input transformer 10 can be expressed by a mathematical expression (2) described below, using this equivalent circuit.

$$V2 = V2m \cdot \sin(\omega L + \theta) = L \cdot (di/dt) + R \cdot i + (1/C) \cdot \int i (dt) \quad (2)$$

The relation between an electric charge q flowing through a capacitor C and a voltage Vc of the capacitor C is expressed by a mathematical expression (3-1), and a current I flowing through the capacitor C is expressed by a mathematical expression (3-2) described below.

$$q = C \cdot Vc \quad (3-1)$$

$$Vc = q/C = (1/C) \cdot \int i(dt)$$

$$i = C \cdot (dVc/dt) \quad (3-2)$$

The mathematical expression (3-2) is substituted into the mathematical expression (2), and thereby a mathematical expression (4) described below is obtained.

$$V2 = L \cdot C \cdot (d^2Vc/dt^2) + R \cdot C \cdot (dVc/dt) + Vc \quad (4)$$

The mathematical expression (4) indicates a differential equation related to the voltage Vc of the capacitor C in the case that the resistor R, the inductance L and the capacitor C are connected in series with each other, and a solution to this differential equation is a sum of a stationary voltage Vc1 and a transient voltage Vc2, and is expressed by a mathematical equation (5) described below.

$$Vc = Vc1 \text{ (steady voltage)} + Vc2 \text{ (transient voltage)} \quad (5)$$

The steady voltage Vc1 indicates a vibration voltage which is synchronized with the input voltage V2. On the other hand, the transient voltage Vc2 is a voltage which attenuates while vibrating. The capacitor voltage Vc is expressed by a voltage that is a sum of the above-described steady voltage Vc1 and the transient voltage Vc2, and is expressed by a mathematical expression (6) described below.

$$Vc = Vc1 \text{ (steady voltage: } A1 \cdot \sin(\omega t + x + y + \theta)) + Vc2$$
$$\text{(transient voltage: } e^{\alpha t} \cdot (A2 \cdot \cos(\beta t + x + \theta) + A3 \cdot \cos(\beta t - y - \theta)))  \quad (6)$$

A1, x, y, θ, α, β shown in the mathematical expression (6) are expressed by a mathematical expression (7) described below.

$$\alpha = -(R/2 \cdot L), \; \beta = (\sqrt{4 \cdot L \cdot C - R^2 \cdot C^2})/2 \cdot L \cdot C$$

$$x = \tan^{-1}(\omega - \beta)/\alpha, \; y = \tan^{-1}(\omega + \beta)/\alpha$$

$$A1 = V2m/(L \cdot C \cdot \sqrt{\alpha^2 + (\omega - \beta)^2} \cdot \sqrt{\alpha^2 + (\omega + \beta)^2})$$

$$A2 = V2m/(2 \cdot L \cdot C \cdot \beta \cdot \sqrt{\alpha^2 + (\omega - \beta)^2})$$

$$A3 = -V2m/(2 \cdot L \cdot C \cdot \beta \cdot \sqrt{\alpha^2 + (\omega + \beta)^2})$$

In addition, the mathematical expression (6) indicates the capacitor voltage Vc, and as is apparent from this mathematical expression (6), the capacitor voltage Vc is a function of a power source closing phase angle (hereinafter, referred to as a closing phase angle) θ described later, and the closing phase angle θ is varied, and thereby the capacitor voltage Vc is changed. In the description of FIG. 5-FIG. 8 and so on described later, it is because of the reason described above that the capacitor voltages Vc indicate different voltage values depending on the closing phase angles θ.

Figure 4:
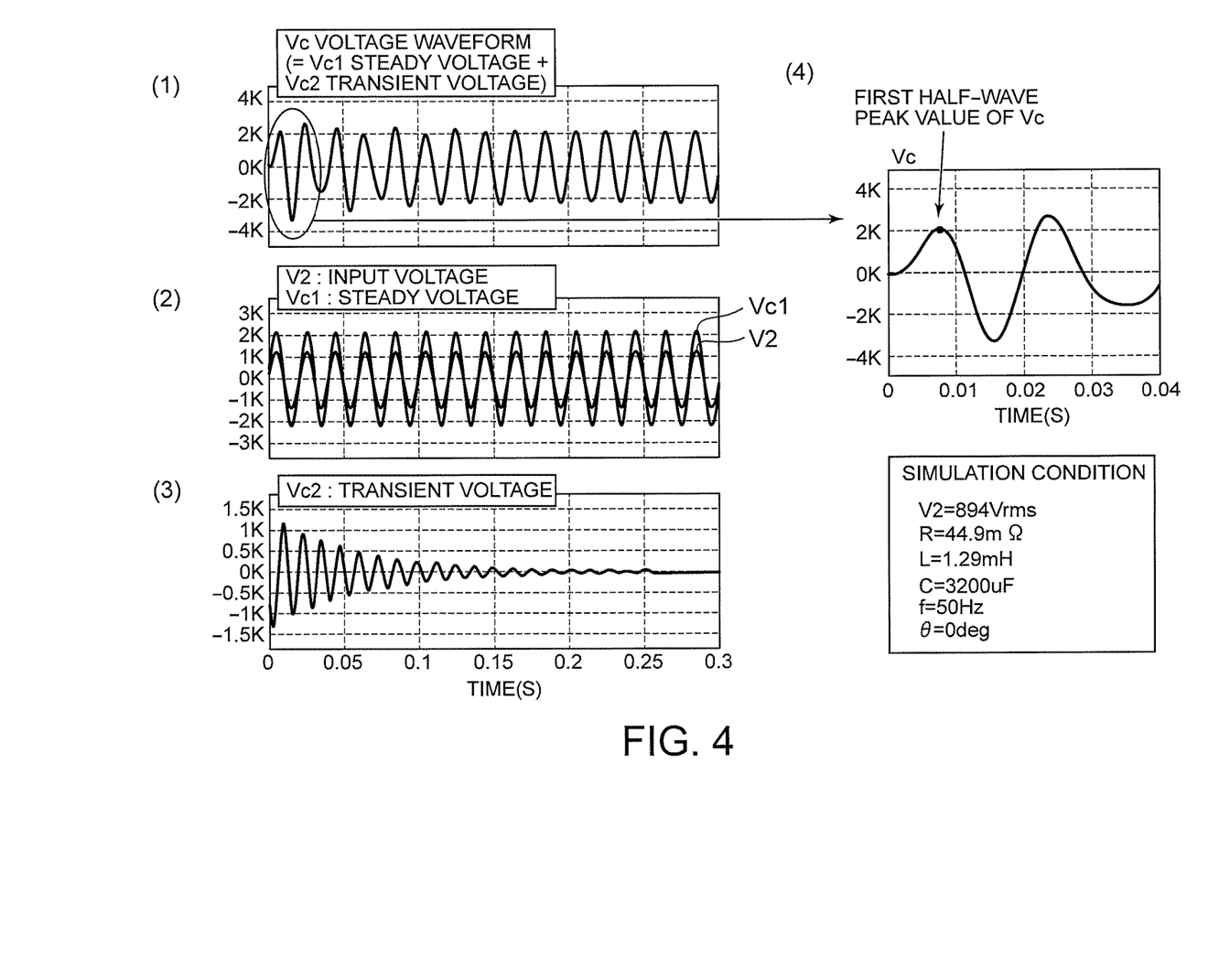
FIG. 4 Simulation waveforms of the model shown in FIG. 3(3).

FIG. 4 shows simulation waveforms of the model shown in FIG. 3(3). The simulation condition is as described below.
V2=894 [Vrms]
R=44.9 [mΩ]
L=1.29 [mH]
C=3200 [μF]
f=50 [Hz]
θ=0 [deg]

FIG. 4(1) shows a voltage waveform of the capacitor voltage Vc indicated by the mathematical expression (4), at the time of the above-described simulation condition, and becomes a waveform of a voltage that is a sum of the steady voltage Vc1 and the transient voltage Vc2 as described above.

FIG. 4(2) shows the input voltage V2 indicated by the mathematical expression (2) and the steady voltage Vc1 indicated by the mathematical expression (6), at the time of the above-described simulation condition.

FIG. 4(3) shows the transient voltage Vc2 indicated by the mathematical expression (6), at the time of the above-described simulation condition.

FIG. 4(4) is an enlarged diagram of the voltage waveform of the capacitor voltage Vc shown in FIG. 4(1) immediately after starting charging. The description regarding FIG. 4(4) will be described later.

Figure 5:
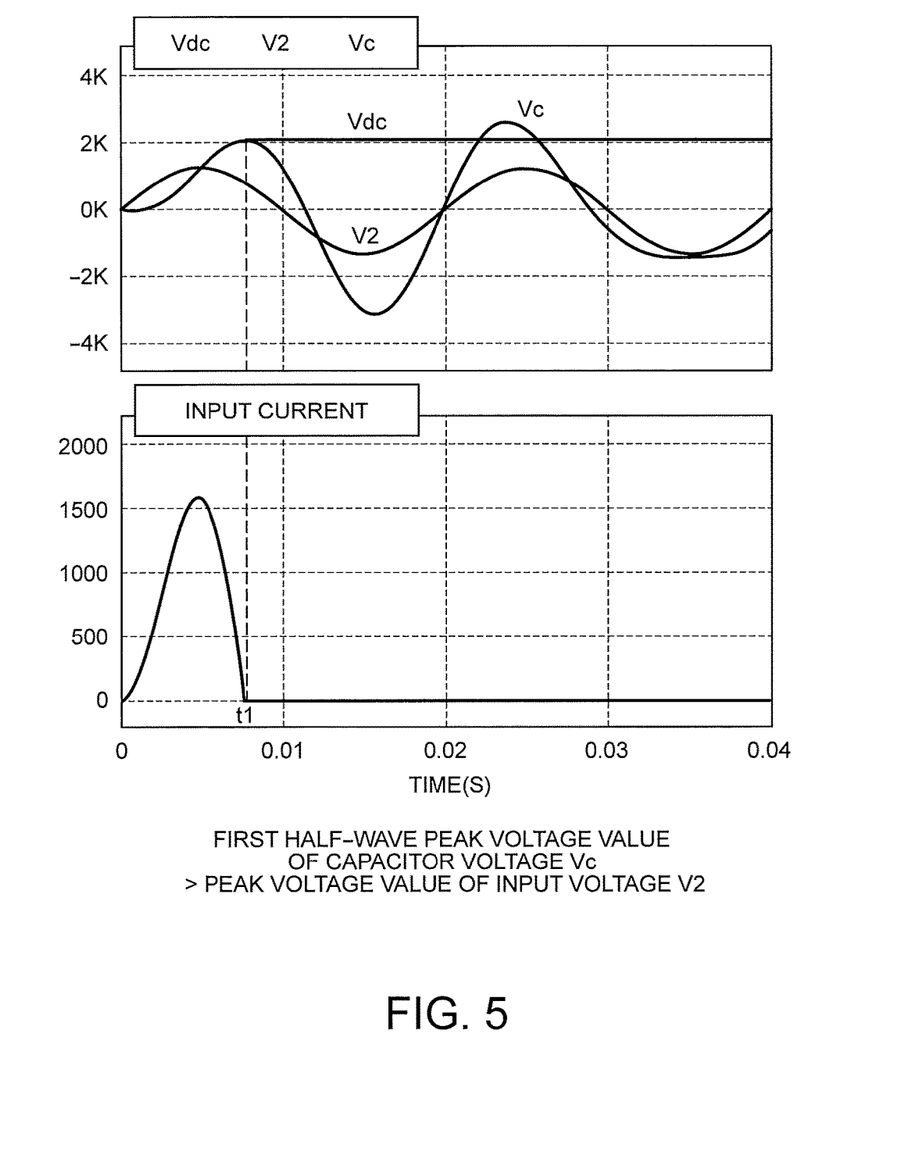
FIG. 5 A diagram showing the relation among a capacitor voltage Vc, an input voltage V2 and a DC voltage Vdc of the capacitor C at the time of initially charging, when "a first half-wave peak voltage value of the capacitor voltage Vc>a peak voltage value of the input voltage V2".

FIG. 5 is a diagram showing the relation among the capacitor voltage Vc, the input voltage V2, and a DC voltage Vdc of the capacitor C at the time of initial charging, when the condition is described below.

Condition: a first half-wave peak voltage value of the capacitor voltage Vc>a peak voltage value of the input voltage V2

The DC voltage Vdc of the capacitor C at the time of initial charging in this case becomes a half-wave peak voltage value when the DC voltage Vdc at the time of initial charging becomes equal to the capacitor voltage Vc, by an operation of the rectifier diodes composing the diode bridge, and since the DC voltage Vdc is held without change, the DC voltage Vdc becomes a voltage larger than the peak value of the input voltage V2.

As the input current i at this time, a charging current flows only at the above-described time of initial charging, but after that (t1 or later), since the input voltage V2 becomes not more than the DC voltage Vdc of the capacitor C, the input current i does not flow.

Figure 6:
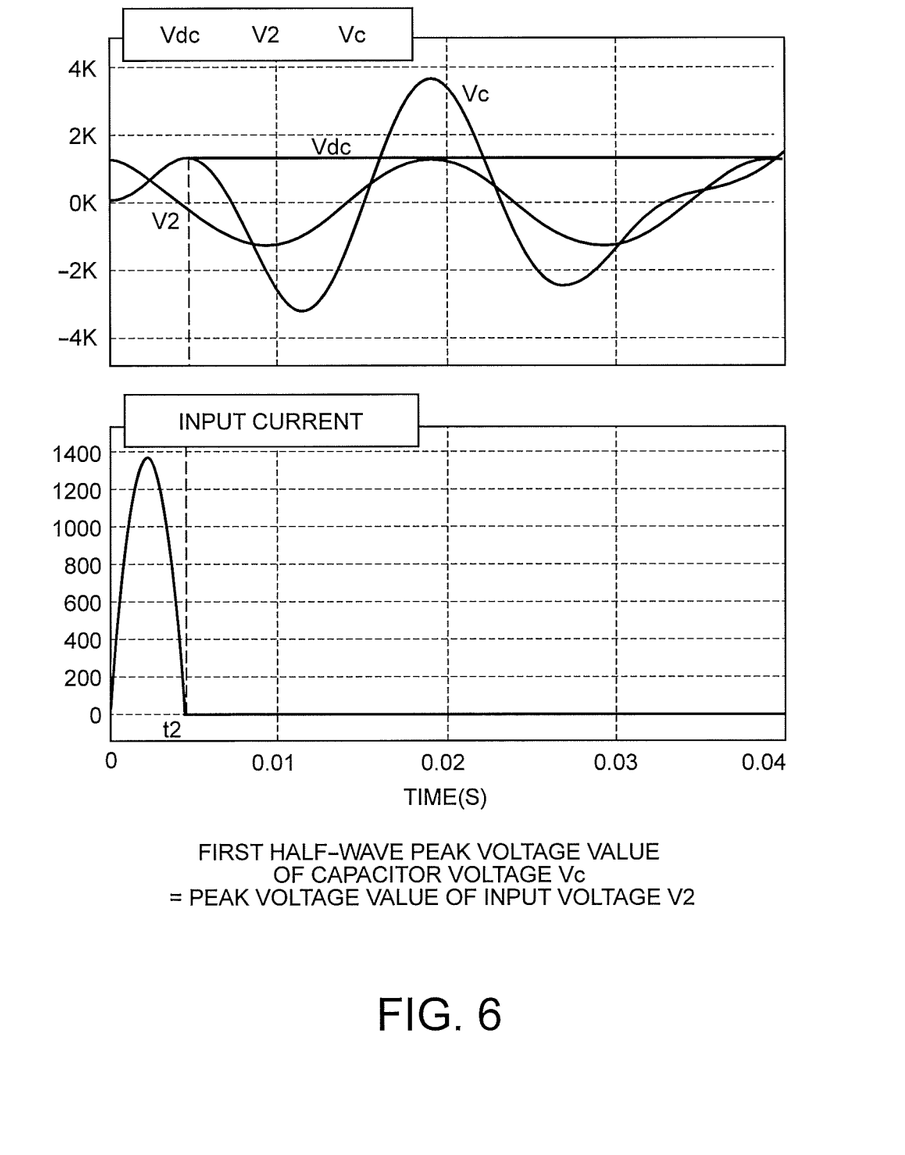
FIG. 6 A diagram showing the relation among the capacitor voltage Vc, the input voltage V2 and the DC voltage Vdc of the capacitor C at the time of initially charging, when "the first half-wave peak voltage value of the capacitor voltage Vc=the peak voltage value of the input voltage V2".

FIG. 6 is a diagram showing the relation among the capacitor voltage Vc, the input voltage V2, and the DC voltage Vdc of the capacitor C at the time of initial charging, when the condition is described below.

Condition: the first half-wave peak voltage value of the capacitor voltage Vc=the peak voltage value of the input voltage V2

The DC voltage Vdc of the capacitor C at the time of initial charging in this case becomes a half-wave peak voltage value when the DC voltage Vdc at the time of initial charging becomes equal to the capacitor voltage Vc, by an operation of the rectifier diodes composing the diode bridge, and since the DC voltage Vdc is held without change, the DC voltage Vdc becomes nearly equal to the peak value of the input voltage V2.

As the input current i at this time, a charging current flows only at the above-described time of initial charging in the same manner as the case of FIG. 5, but after that (t2 or later), since the input voltage V2 becomes not more than the DC voltage Vdc of the capacitor C, the input current i does not flow.

Figure 7:
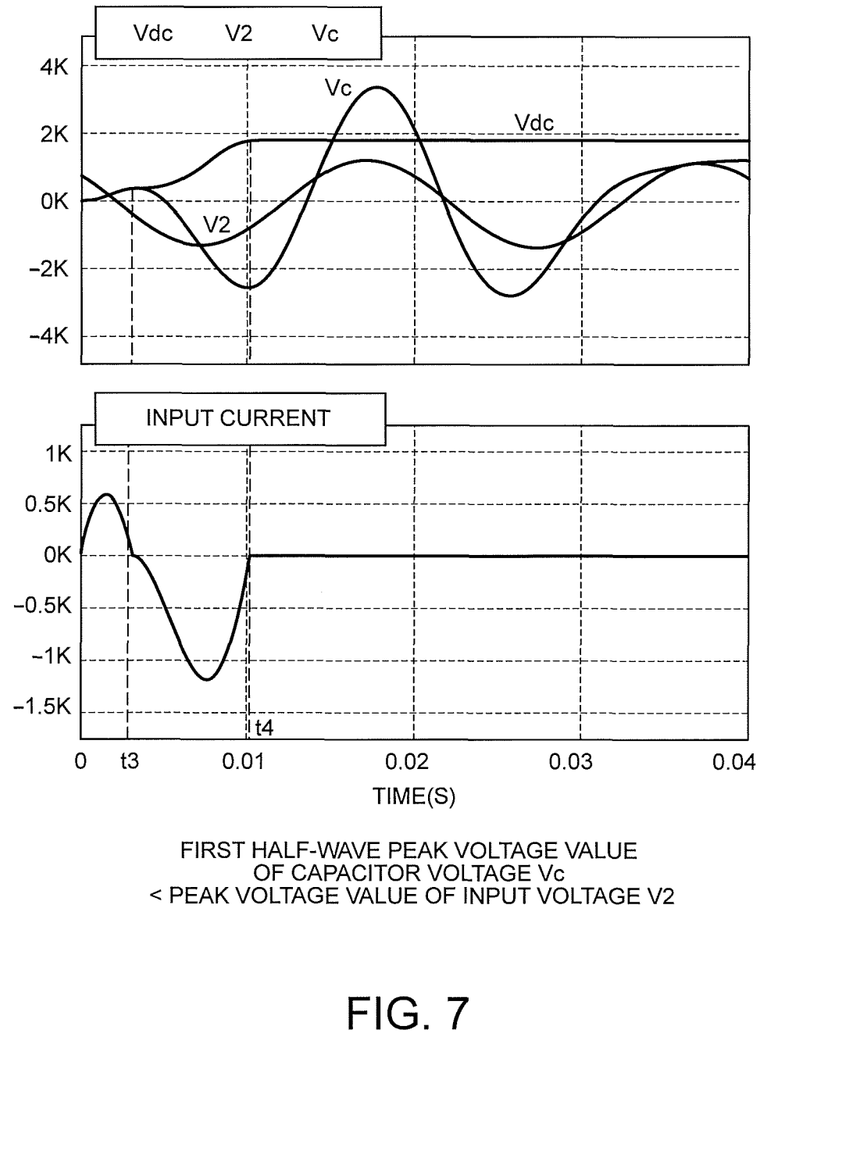
FIG. 7 A diagram showing the relation among the capacitor voltage Vc, the input voltage V2 and the DC voltage Vdc of the capacitor C at the time of initially charging, when "the first half-wave peak voltage value of the capacitor voltage Vc<the peak voltage value of the input voltage V2".

FIG. 7 is a diagram showing the relation among the capacitor voltage Vc, the input voltage V2, and the DC voltage Vdc of the capacitor C at the time of initial charging, when the condition is described below.

Condition: the first half-wave peak voltage value of the capacitor voltage Vc<the peak voltage value of the input voltage V2

The DC voltage Vdc of the capacitor C at the time of initial charging in this case is once charged to the first half-wave peak voltage value of the capacitor voltage Vc (timing t3), and is charged again when an absolute value of the input voltage V2 becomes not less than the DC voltage Vdc of the capacitor C at the time of initial charging (timings t3-t4). Since this charging corresponds to a case in which the voltages Vdc and Vc have initial voltages in FIG. 7, the DC voltage Vdc is eventually charged to a value larger than the peak value of the input voltage V2.

In addition, during the timings t3-t4, the input voltage V2 shows a negative voltage, but since the input voltage V2 is converted into a voltage in one direction constantly with respect to the capacitor C by an operation of the above-described diode bridge, when an absolute value of the input voltage V2 exceeds the DC voltage Vdc, the capacitor C2 comes to be charged by the relevant input voltage V2.

Figure 8:
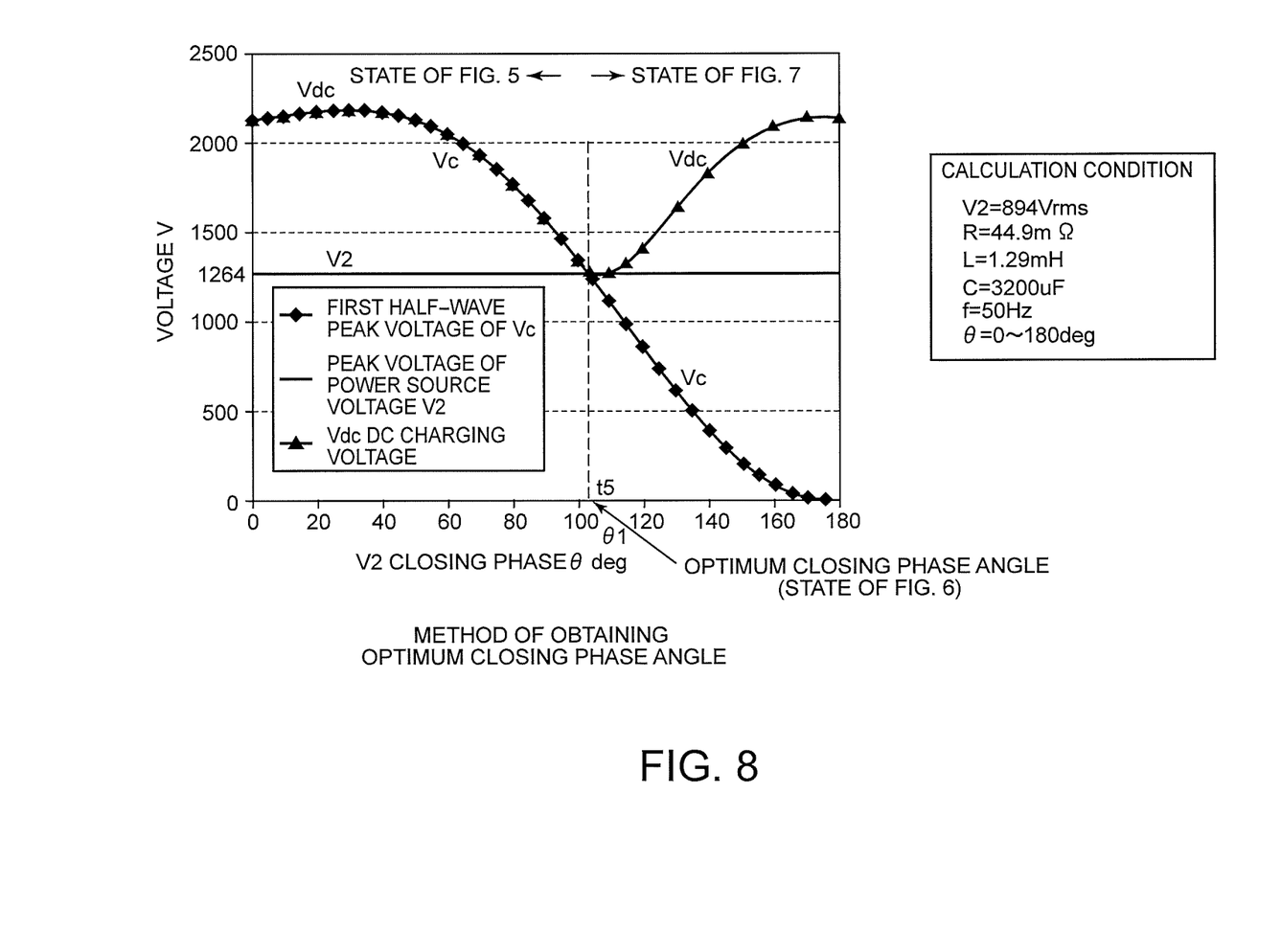
FIG. 8 A diagram showing a method of obtaining an optimum closing phase angle θ1 in the power conversion apparatus 100 according to the present embodiment.

FIG. 8 is a diagram showing a method of obtaining an optimum closing phase angle θ1 in the power conversion apparatus 100 according to the present embodiment. Here, FIG. 8 is a diagram in which the capacitor voltage Vc and the DC voltage Vdc of the capacitor C at the time of initial charging to the closing phase angle θ [deg] of the input voltage V2 have been calculated.

It is found by the above-description that a case in which the DC voltage Vdc becomes the lowest value is the case shown in FIG. 6 in which the first half-wave peak voltage value of the capacitor voltage Vc=the peak voltage value of the input voltage V2. The first half-wave voltage value of the capacitor voltage Vc varies depending on the power source closing phase angle θ. Accordingly, θ in the case in which the first half-wave peak voltage value of the capacitor voltage Vc=the peak voltage value of the input voltage V2 becomes the optimum closing phase angle θ1.

Because it is difficult to analytically obtain the optimum closing phase angle θ1, first half-wave peak voltage values of the capacitor voltage Vc are calculated using the above-described mathematical expression (6) for each 5 [deg] of the closing phase angle θ, in a range of θ (0 [deg]≤θ≤180 [deg]), and the optimum closing phase angle θ1 is obtained from the graph shown in FIG. 8. In addition, the simulation condition is as described below.
V2=894 [Vrms]
R=44.9 [mΩ]
L=1.29 [mH]
C=3200 [μF]
f=50 [Hz]
θ=0-180 [deg]

In the case of the present embodiment, a crossing point (a timing t5) of the first half-wave peak voltage values of the capacitance voltage Vc at the respective closing phase angles θ which have been calculated using the above-described mathematical expression (6), and the peak voltage value of the input voltage V2 becomes the optimum closing phase angle θ1. In the case of the example shown in the drawing, the optimum closing phase angle θ1 becomes 103 [deg]. Specific description thereof will be made below.

A phase angle θ1 of a crossing point (the timing t5) of the peak voltage value of the input voltage V2 ($=\sqrt{2} \times V2=1264$ [V]) and a graph obtained by plotting the peak voltage values in the first half-wave (θ=0-180 [deg]) of the capacitor voltage Vc becomes the optimum closing phase angle. In the case of the present embodiment, the optimum closing phase angle θ1 becomes 103 [deg], as described above.

Figure 9:
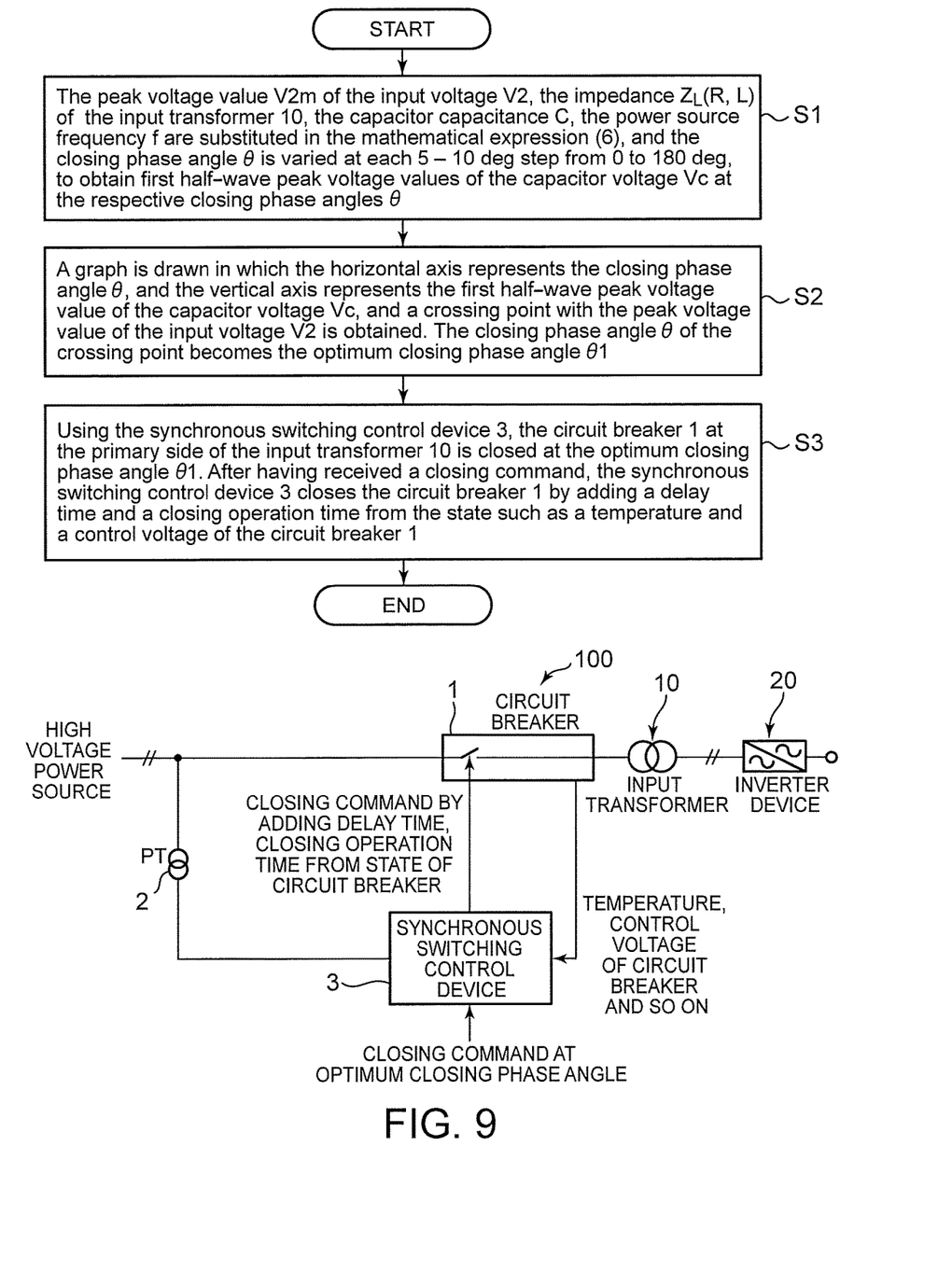
FIG. 9 A flow chart for describing an operation for closing the circuit breaker 1 at the optimum closing phase angle θ1 set in the present embodiment.

FIG. 9 is a flow chart for describing an operation for closing the circuit breaker 1 at the optimum closing phase angle θ1 which has been set in the present embodiment.

To begin with, the peak voltage value V2m [V] of the input voltage V2, the total secondary side converted winding resistance R [Ω] of the primary side and the secondary side of the input transformer 10, the total leakage inductance L [H] of the primary side and the secondary side of the input transformer 10, the capacitor C [F], the power source frequency f [Hz] are substituted in the above-described mathematical expression (6), and the closing phase angle θ [deg] is varied at each 5-10 [deg] interval from 0 to 180 [deg], to obtain first half-wave peak voltage values of the capacitor voltage Vc at the respective closing phase angles θ [deg] (S1). In addition, the closing phase angle θ [deg] indicates θ [deg] in the mathematical expression (6).

Next, a graph is drawn in which the horizontal axis represents the closing phase angle θ, and the vertical axis represents the first half-wave peak voltage value of the capacitor voltage Vc, and a crossing point with the peak voltage value of the input voltage V2 is obtained. The closing phase angle θ of the crossing point becomes the optimum closing phase angle θ1 (S2).

Next, the circuit breaker 1 connected to the primary side of the input transformer 10 is closed at the optimum closing phase angle θ1, using the synchronous switching control device 3. After having received a closing command, the synchronous switching control device 3 closes the circuit breaker 1 by adding a delay time and a closing operation time from the state such as a temperature and a control voltage of the circuit breaker 1 (S3).

After the above-described processing, the circuit breaker 1 is closed at the optimum closing phase angle θ1, and the input voltage V2 is supplied to the input transformer 10.

As described above, according to the present embodiment, overcharge caused by the DC voltage Vdc exceeding the input voltage V2 can be prevented, and thereby it is possible to provide a power conversion apparatus and an initial charging method of the same which can solve "the problem to be solved by the invention".

Embodiment 2

The embodiment 1 has been described regarding the case in which the high voltage power source to supply a power to the circuit breaker 1 is a single-phase AC power source. However, the present invention can be applied to a power conversion apparatus in a case that the above-described high voltage power source is a three-phase AC power source of a U-phase, a V-phase, a W-phase, which is provided with the circuit breaker 1, the input transformer 10, the inverter device 20, the synchronous switching control device 3 and the controller 30 which have been described in the embodiment 1 for each phase of the U-phase, the V-phase, the W-phase.

In this case, the above-described synchronous switching control device 3 detects the phase angle of a voltage of the high voltage power source for each of the U-phase, the V-phase, the W-phase, and controls to close or break the circuit breaker 1 which is provided for each of the above-described phases at a timing to reach a prescribed phase angle for each phase.

A control method of the circuit breaker 1 is the same as the embodiment 1. That is, the circuit breaker 1 connected to the primary side of the input transformer 10 is closed at the above-described optimum closing phase angle θ1 for each phase.

After the above-described processing, the circuit breaker 1 is closed at the optimum closing phase angle θ1, and the input voltage V2 is supplied to the input transformer 10.

As described above, according to the present embodiment 2, overcharge caused by the DC voltage Vdc exceeding the input voltage V2 can be prevented, and thereby it is possible to provide a power conversion apparatus and an initial charging method of the same which can solve "the problem to be solved by the invention".

DESCRIPTION OF THE SYMBOLS 1 circuit breaker
2 potential transformer
3 synchronous switching control device
10 input transformer
20 inverter device
21 converter section
22 inverter section
30 controller
100 power conversion apparatus

The invention claimed is:

1. A power conversion apparatus, characterized by comprising:
    an input transformer which converts a high voltage power of a high voltage power source into an AC power which an inverter device requires;
    a circuit breaker which is arranged between the high voltage power source and the input transformer, and closes or breaks an electric circuit for supplying the high voltage power to be supplied from the high voltage power source to the input transformer;
    a converter section which converts the AC power converted by the input transformer into a DC power;
    a smoothing capacitor which smooths the DC power converted by the converter section; and
    a synchronous switching control device which detects a phase angle of a voltage of the high voltage power source, and controls to close or break the circuit breaker, at a timing when the detected phase angle reaches a prescribed phase angle, wherein
    the synchronous switching control device controls to close the circuit breaker when the prescribed phase angle is a phase angle in which a first half-wave peak voltage value of the smoothing capacitor coincides with a peak voltage value of an input voltage of the input transformer.

2. The power conversion apparatus according to claim 1, characterized in that:
    the high voltage power source is a single-phase AC power source.

3. A power conversion apparatus, characterized by comprising, for each phase of a U-phase, a V-phase, a W-phase:
    an input transformer which converts a high voltage power of a high voltage power source into an AC power which an inverter device requires;

the high voltage power source being a three-phase AC power source of the U-phase, the V-phase, the W-phase;

a circuit breaker which is arranged between the high voltage power source and the input transformer, and closes or breaks an electric circuit for supplying the high voltage power to be supplied from the high voltage power source to the input transformer;

a converter section which converts an AC power converted by the input transformer into a DC power;

a smoothing capacitor which smooths the DC power converted by the converter section; and a synchronous switching control device which detects a phase angle of a voltage of the high voltage power source, and controls to close or break the circuit breaker, at a timing when the detected phase angle reaches a prescribed phase angle;

the synchronous switching control device controlling to close or break the circuit breaker provided for each of the U-phase, the V-phase, the W-phase, and the synchronous switching control device controlling to close the circuit breaker when the prescribed phase angle is a phase angle in which a first half-wave peak voltage value of the smoothing capacitor coincides with a peak voltage value of an input voltage of the input transformer.

4. An initial charging method of a power conversion apparatus comprising an input transformer which converts a high voltage power of a high voltage power source into an AC power which an inverter device requires, a circuit breaker which is arranged between the high voltage power source and the input transformer, and closes or breaks an electric circuit for supplying the high voltage power to be supplied from the high voltage power source to the input transformer, a converter section which converts the AC power converted by the input transformer into a DC power, a smoothing capacitor which smooths the DC power converted by the converter section, and a synchronous switching control device which detects a phase angle of a voltage of the high voltage power source, and controls to close or break the circuit breaker, at a timing when the detected phase angle reaches a prescribed phase angle, characterized by comprising:

calculating a voltage (Vc) of the smoothing capacitor (C) when a closing phase angle ($\theta$) is varied between 0 to 180 [deg] at a prescribed interval, taking the closing phase angle ($\theta$) as a parameter, based on a prescribed calculation expression, using an input voltage (V2) of the input transformer, a total secondary side converted winding resistance R [$\Omega$] of a primary side and a secondary side of the input transformer, a total leakage inductance L [H] of the primary side and the secondary side of the input transformer, the smoothing capacitor (C), a power source frequency f [Hz];

calculating a closing phase angle ($\theta 1$) in which a peak voltage value of the input voltage (V2) coincides with the voltage (Vc) of the smoothing capacitor; (C); and closing the circuit breaker at a timing of the calculated closing phase angle ($\theta 1$) by the synchronous switching control device.

5. The initial charging method of a power conversion apparatus according to claim 4, characterized in that:

the prescribed calculation expression is given by a following expression (8)

$$Vc = A1 \cdot \sin(\omega t + x + y + \theta) + e^{\alpha t} \cdot (A2 \cdot \cos(\beta t + x + \theta) + A3 \cdot \cos(\beta t - y - \theta))$$

$$\alpha = -(R/2 \cdot L),\ \beta = (\sqrt{4 \cdot L \cdot C - R^2 \cdot C^2})/2 \cdot L \cdot C,$$

$$x = \tan^{-1}(\omega - \beta)/\alpha,\ y = \tan^{-1}(\omega + \beta)/\alpha$$

$$A1 = V2m/(L \cdot C \cdot \sqrt{\alpha^2 + (\omega - \beta)^2} \cdot \sqrt{\alpha^2 + (\omega + \beta)^2})$$

$$A2 = V2m/(2 \cdot L \cdot C \cdot \beta \cdot \sqrt{\alpha^2 + (\omega - \beta)^2})$$

$$A3 = -V2m/(2 \cdot L \cdot C \cdot \beta \cdot \sqrt{\alpha^2 + (\omega + \beta)^2}) \qquad (8).$$

* * * * *